US008243311B2

(12) United States Patent  (10) Patent No.: US 8,243,311 B2
Yoshimura  (45) Date of Patent: Aug. 14, 2012

(54) IMAGE OUTPUT APPARATUS FOR CONTROLLING ORDER OF PRINT JOBS AND DISPLAY JOBS IN QUEUE

(75) Inventor: Sohichi Yoshimura, Nara-shi (JP)

(73) Assignee: Sharp Kabushiki Kaisha, Osaka (JP)

( * ) Notice: Subject to any disclaimer, the term of this patent is extended or adjusted under 35 U.S.C. 154(b) by 843 days.

(21) Appl. No.: 12/261,654

(22) Filed: Oct. 30, 2008

(65) Prior Publication Data

US 2009/0116058 A1    May 7, 2009

(30) Foreign Application Priority Data

Nov. 1, 2007  (JP) ................................ 2007-285287

(51) Int. Cl.
  *G06F 3/12*  (2006.01)
  *G06K 15/00*  (2006.01)
(52) U.S. Cl. ...................... 358/1.15; 358/1.13; 358/1.16; 715/255; 715/274; 715/277; 399/81; 399/85; 399/87
(58) Field of Classification Search ............... 358/1.1, 358/1.13, 1.15, 1.16, 1.9, 1.18, 1.14; 715/274, 715/277, 255; 399/81, 85, 87
See application file for complete search history.

(56) References Cited

U.S. PATENT DOCUMENTS

| | | | |
|---|---|---|---|
| 6,616,359 B1 * | 9/2003 | Nakagiri et al. ............... 400/582 |
| 7,304,753 B1 * | 12/2007 | Richter et al. ............... 358/1.15 |
| 8,035,840 B2 * | 10/2011 | Mizutani et al. ............... 358/1.15 |
| 8,115,940 B2 * | 2/2012 | Utsunomiya et al. ......... 358/1.13 |
| 2003/0020944 A1 * | 1/2003 | Bhogal et al. ................. 358/1.15 |
| 2003/0103221 A1 * | 6/2003 | Natori ............................ 358/1.9 |
| 2004/0184080 A1 * | 9/2004 | Gotoh et al. .................. 358/1.15 |
| 2005/0088668 A1 * | 4/2005 | Sesek et al. .................... 358/1.1 |
| 2005/0254084 A1 * | 11/2005 | Imoto ........................... 358/1.15 |
| 2006/0023240 A1 | 2/2006 | Natori | |

FOREIGN PATENT DOCUMENTS

| | | |
|---|---|---|
| JP | 2000-062288 A | 2/2000 |
| JP | 2003-177904 A | 6/2003 |
| JP | 2006-039941 A | 2/2006 |

* cited by examiner

*Primary Examiner* — Twyler Haskins
*Assistant Examiner* — Dennis Dicker
(74) *Attorney, Agent, or Firm* — Birch, Stewart, Kolasch & Birch, LLP

(57) ABSTRACT

An image output apparatus including: an image processing section for processing an image; a printing section that prints the image; a display section that displays the image; an instruction section that allows a user to instruct execution of a print job, and execution of a display job; and a job control section that controls the jobs to start the execution of the print job or the display job in response to the instruction, wherein when the job control section receives instructions to start print jobs and/or display jobs, the job control section controls the jobs to register the print jobs and/or the display jobs in a queue and start these jobs in the order, and when an instruction for a display job in the queue is again received from the instruction section, the job control section controls the jobs to move the display job to the forefront of the queue.

4 Claims, 9 Drawing Sheets

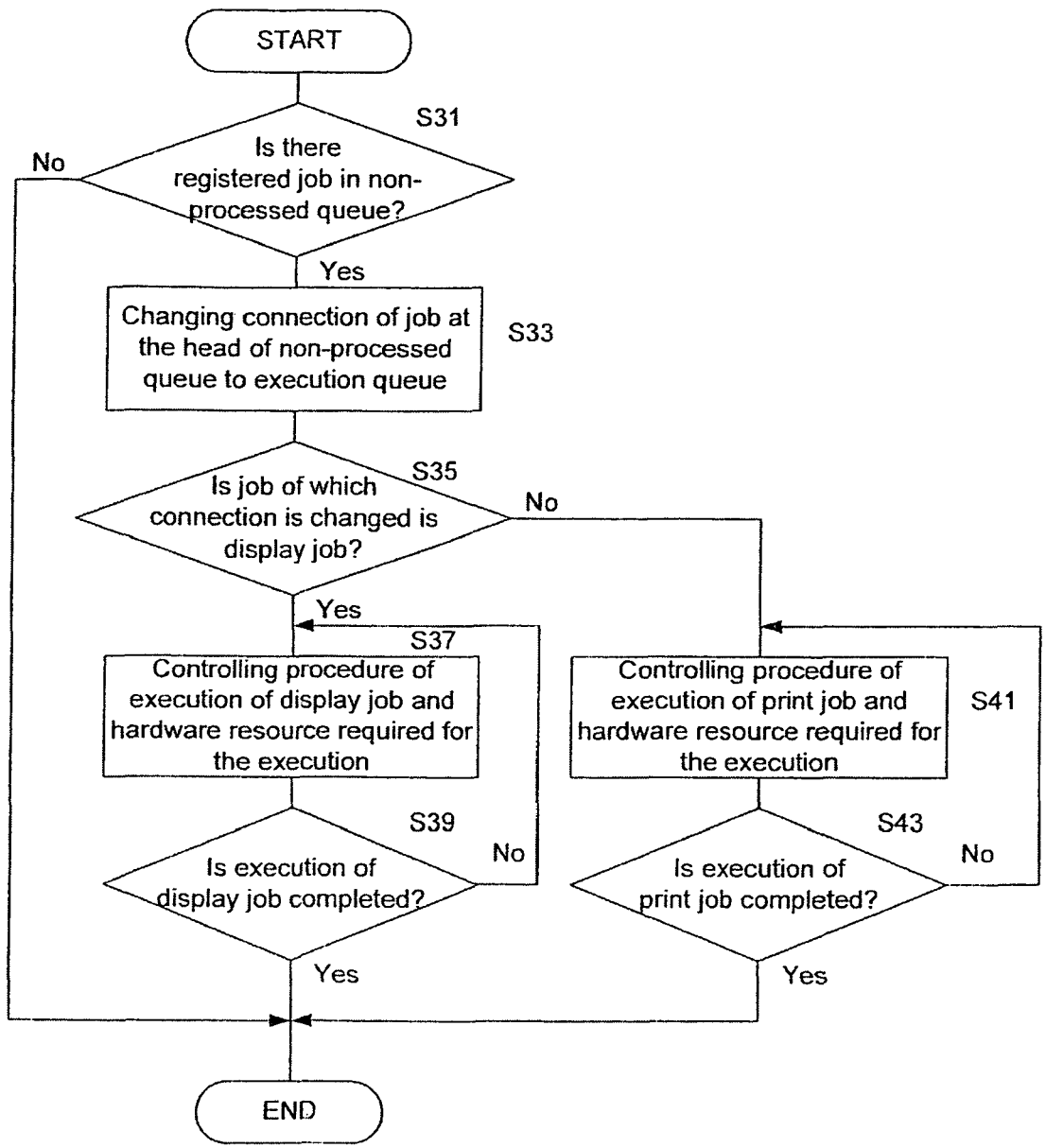

IMAGE OUTPUT APPARATUS FOR CONTROLLING ORDER OF PRINT JOBS AND DISPLAY JOBS IN QUEUE

CROSS-REFERENCE TO RELATED APPLICATION

This application is related to Japanese Patent Application No. 2007-285287 filed on Nov. 1, 2007, whose priority is claimed and the disclosure of which is incorporated by reference in its entirety.

BACKGROUND OF THE INVENTION

1. Field of the Invention

The present invention relates to an image output apparatus that can output an image to a printing section and a display section.

2. Description of the Related Arts

Apparatuses that print an image and display the image onto a display section have been known. For example, there are some facsimile apparatuses or digital multi function peripherals provided with a display section which can not only print a received image or read image but also display the image onto the display section. This is related to a situation in which a cheap and high-definition dot matrix display apparatus represented by a liquid crystal display apparatus has been available in recent years. Specifically, a conventional display apparatus incorporated into a device generally has less display dot number and small screen, so that it is unsuitable for displaying an image. However, with the progress of the display apparatus described above, a display apparatus that can also be used for displaying an image has been adopted.

For example, there has been proposed an apparatus that displays, for a preview, an expected print image based on a print condition that is inputted and set, prior to a printing process (refer to Japanese Unexamined Patent Publication No. 2000-062288).

As described above, the most general purpose in displaying an image onto a display section in the apparatus (hereinafter referred to as an image output apparatus in this specification) that can display the image to be printed onto the display section is the preview before the printing. The basis of the preview function is to display the condition corresponding to the finish of the printing onto the display section.

In general, data of an image to be printed is stored as coded or compressed in an image memory in an output apparatus. In order to print or display the stored image data, it is necessary that the image data be read from the image memory so as to decode or expand the data. The image output apparatus includes an image processing section for performing these processes. These processes are needed to print and display the image, and further, reasonable processing time is needed since complicated process is performed for image data having large capacity. When a new processing request for another data is received during these processes, it is general that the processing request received later is registered in a queue so as to be brought into a stand-by state until the processing, which is currently executed, is completed. This is because the image processing section does not have a capability of simultaneously executing the processing request received later without delaying the processing that is currently executed.

Even if the image processing section has a high processing capability, it takes reasonable time for a printing section to print the image. Therefore, a conventional image output apparatus determines the capability of the image processing section so as to be matched with the processing capability (printing speed) of the printing section. This is because, even when the capability of the image processing section is increased more, the printing speed is not increased, although cost is vainly increased.

On the other hand, the processing speed of the display section is generally higher than the processing speed of the printing section. For example, the printing section having a printing speed of 60 sheets/min. (A4 size) prints an image of an A4 size in one second, while the rewriting speed of the display section for one screen is generally much higher than this speed. Therefore, the display speed of the preview image is determined according to the capability of the image processing section, not determined according to the drawing capability of the display section. Therefore, a user who gives an instruction of a preview display has to wait for some time until the preview image is displayed onto a screen after the instruction is given. Since a screen of a television or a personal computer is more rapidly switched than the situation described above, the user is not used to be waited. Even so, it is not realistic that cost is increased only for the preview function, which can be said to be ancillary, in order to enhance the capability of the image processing section. Further, it is not a suitable measure to always carry out the preview process in preference to the printing process. When the request for the preview is frequently made, the printing speed might be reduced apparently.

SUMMARY OF THE INVENTION

The present invention has been made in view of the circumstance described above, and provides a technique of arbitrating the order of processing a print job and a display job in order to minimize a waiting time until the display job is executed, by using an image processing section having a finite processing capability.

The invention provides an image output apparatus including: an image storage section that stores an image to be printed; an image processing section that can perform a printing image process for printing the stored image and a display image process for displaying the stored image; a printing section that prints the image, which has been subjected to the printing image process; a display section that displays the image, which has been subjected to the display image process; an instruction section that allows a user to selectively instruct execution of a print job, which is a procedure to cause the printing section to print the image, and execution of a display job, which is a procedure to cause the display section to display the image; and a job control section that controls the jobs to start the execution of the print job or the display job in response to an instruction from the instruction section, wherein when the job control section receives instructions from the instruction section to start a plurality of print jobs and/or display jobs, the job control section controls the jobs to register the print jobs and/or the display jobs in a queue and start these jobs in the order in which the instructions are given, and when an instruction for a display job in the queue is again received from the instruction section while the display job is being registered after the print job, the job control section controls the jobs to move the display job to the forefront of the queue.

The image storage section in the present invention may be a primary memory (SDRAM, etc.) to which a CPU can directly access. Alternatively, it may be a secondary memory (hard disk drive, etc.) that stores large-capacity data compared to the primary memory. The printing section indicates an apparatus that forms an image and prints the same onto a printing sheet, i.e., a printer engine. The display section may be a display apparatus using an LCD or the like, and may have a function of informing a user of a status of the apparatus. One embodiment of the instruction section is, for example, an operation section that allows a user to input an instruction with the use of a key or a switch. The display section may have a function of a touch panel and function as an operation section. In addition to the operation by the key or the switch, a predetermined command, which is received from an external device through a communication line, may be defined as the instruction. The job control section is the most characteristic component in the present invention. One embodiment of the job control section is realized by the execution of a control program by the CPU or microcomputer.

In the image output apparatus according to the present invention, when the job control section receives an instruction to start a plurality of print jobs and/or display jobs, it controls such that these print jobs and/or display jobs are registered in a queue so as to be capable of being started in the order the instruction is received, and when the instruction to start the display job is further given with the display job registered after the print job, the job control section controls such that the display job is moved to the head of the queue. Therefore, when the instruction to start the display job is again received the order of processing the print job and the display job is arbitrated in order to minimize the waiting time until the display job is executed.

Preferred embodiments of the present invention will be described below.

According to the present invention, when a display job is registered in the queue, the instruction section may allow a user to give an instruction again for the display job. By virtue of this, when the display job is not registered, the instruction to start can be determined to be the request to start the display job, while when the display job is registered, the instruction to start can be determined to be a preferential request to execute the display job.

The image output apparatus of the present invention may further include: a job display control section that allows the display section to display information involved with each job in the queue, wherein the instruction section may allow a user to give an instruction again for the display job, when the information involved with the display job is displayed on the display section. By virtue of this, the job having the image data to be displayed can be selected among the jobs in the queue, and further, a user can visually recognize the image of which job is to be displayed.

The display job may aim at a preview of an image to be printed. By virtue of this, the image relating to the print job in the queue can be displayed as a preview display.

The preferred embodiments described above can be combined.

BRIEF DESCRIPTION OF THE DRAWINGS

FIG. 9 is a flowchart showing a procedure for controlling the execution of a display job by the CPU serving as the job control section in the embodiment of the present invention.

DETAILED DESCRIPTION OF THE INVENTION

The present invention will be described in more detail below with reference to the drawings. It should be understood that the following description is illustrative of the invention in all aspects, but not limitative of the invention.

<Example of Electronic Configuration of Image Output Apparatus>

As one example of an image output apparatus according to the present invention, a configuration of a digital multi function peripheral will be described. In particular, embodiments of an image storage section, an instruction section, and a job control section in the present invention, and a relationship between these sections and a printing section and a display section in terms of a control will be described.

Figure 2:
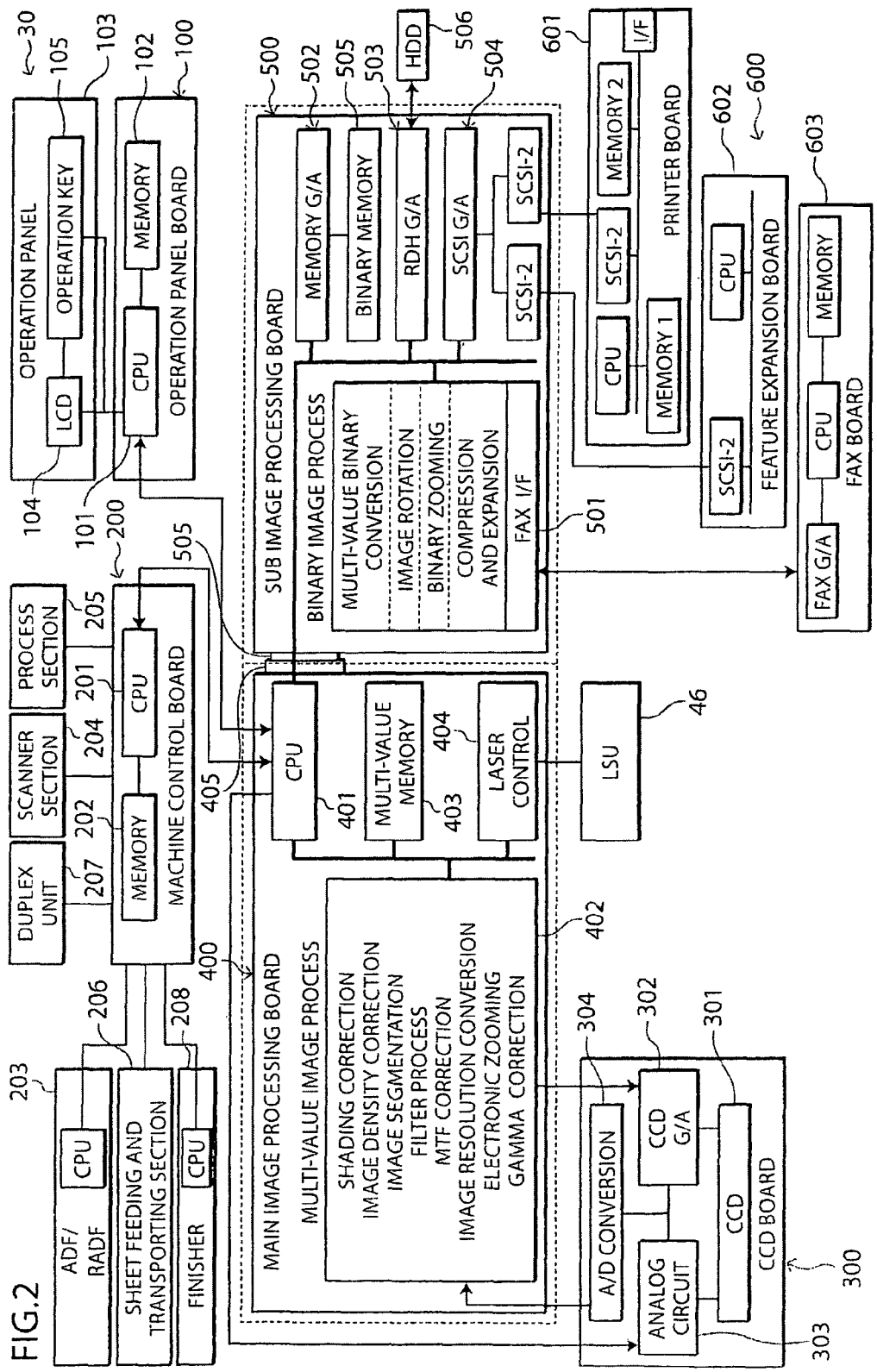
FIG. 2 is a block diagram showing an electronic configuration of the digital multi function peripheral according to the embodiment of the present invention.

FIG. 2 is a block diagram showing an electronic configuration of a digital multi function peripheral in this embodiment. The digital multi function peripheral 30 shown in FIG. 2 operates in such a manner that a main central processing unit 401 (CPU) cooperates with sub central processing units (CPU) 101 and 201 mounted to each section. An operation panel board 100 manages and controls an operation panel. A machine control board 200 manages and controls the operation of mechanisms of the digital multi function peripheral 30. A CCD board 300 electrically reads a document image and converts the same into electronic data. A main image processing board 400 performs a predetermined image process to the document image that is formed into the electronic data by the CCD board 300. A sub-image processing board 500 further performs a predetermined image process to the image data that is processed at the main image processing board 400. Other extension board group 600 (printer board, FAX board, feature expansion board) is connected to the sub image processing board 500 via an interface.

The detail of the function of each board will be described below.

1. Operation Panel Board

The operation panel board 100 has the sub central processing unit (CPU) 101 and a memory 102. The CPU 101 controls a display screen of an LCD display section 104 (corresponding to the display section in the present invention) arranged on an operation panel 103, and an operation key group 105 (corresponding to the instruction section in the present invention) prepared for a user to input various instructions. The memory 102 stores an instruction inputted with the use of the operation key group 105 or information that is to be displayed onto the LCD display section 104.

The central processing unit (CPU) 101 communicates with the main central processing unit (CPU) 401.

2. Machine Control Board

The machine control board 200 has the sub central processing unit (CPU) 201 and a memory 202. The CPU 201 controls an automatic document feeder (document transporting section) 203 such as an ADF or RADF, a scanner section (document reading section) 204 that reads the document image, a processing section (image forming section) 205 that forms an image corresponding to the image data, a sheet feeding section 206 that conveys a printing sheet, a duplex unit 207 that inversely transports the sheet in order that the image is printed on both surfaces of the sheet, a finisher 208 that performs a post-processing of the sheet, etc. The memory 202 provides a work area to the CPU 201.

3. CCD Board

The CCD board 300 has blocks of a CCD sensor 301 that electrically reads the document image, a driving circuit (CCD gate array) 302 of the CCD sensor 301, an analog circuit 303 that performs a gain adjustment of an analog signal outputted from the CCD sensor 301, and an A/D converter 304 that converts the analog output into a digital signal. Each block is controlled by the central processing unit (CPU) 401.

4. Main Image Processing Board

The main image processing board 400 has a multi-value image processing section 402 (forming a part of the image processing section in the present invention) that performs a process to multi-value image data based on the electronic data of the document image sent from the CCD board 300 in order that the gradation of the image can be expressed in a desired state, a multi-value memory 403 that stores image data or various control information pieces, and a laser control 404 that transfers the image data to a laser scanning unit 46. The multi-value image processing section 402 is composed of a circuit block that performs a process to the multi-value image data, such as a shading correction, image density correction, image segmentation, filter process, MTF correction, image resolution conversion, electronic zooming (variable magnification process) and gamma correction. The image data subjected to the process is stored in the multi-value memory 403. The image data subjected to the process is transferred to the laser scanning unit (LSU) 46.

The CPU 401 controls the operation of each section of the main image processing board 400. The function of the job control section according to the present invention is realized by the execution of the program by the CPU 401.

5. Sub Image Processing Board

The sub image processing board 500 is connected to the main image processing board 400 with a pair of connectors 505 and 405. The sub image processing board 500 has a binary image processing section 501 (forming a part of the image processing section in the present invention), a memory gate array 502, an RDH gate array 503, an SCSI gate array 504, and a binary memory 505 (forming a part of the image storage section in the present invention). Further, the sub image processing board 500 is connected to an external hard disk drive (HDD) 506 through the RDH gate array 503. The HDD 506 also corresponds to a part of the image storage section in the present invention. It is to be noted that, as a modification, there is an embodiment in which the image output apparatus has a large-capacity multi-value memory 403 or a binary memory 505, which corresponds to the image storage section.

The binary image processing section 501 is composed of circuit blocks of a multi-value binary conversion section that converts the multi-value image data into a binary image, a compression/expansion section that compresses and expands the binary image, an image rotating section that rotates the binary image, a binary variable magnification (zoom) section that performs a variable magnification process to the binary image, and the like. The binary image processing section 501 also has a FAX I/F section for sending and receiving an image to and from an external facsimile apparatus through a FAX board 603 that is connected through a public circuit.

The memory gate array is a memory for storing binary image data. The memory gate array 502 controls the reading and writing operations of the binary memory 505. The RDH gate array 503 controls the reading and writing operations of the HDD 506. The HDD 506 stores binary image data of a plurality of pages. The SCSI gate array 504 controls the operations of the SCSI as an external interface and SCSI.

6. Extension Board Via SCSI

The extension board group 600 that is connected to the sub image processing board 500 through the SCSI includes a printer board 601 and a feature expansion board 602.

The printer board 601 is connected to an external device, such as a personal computer, through a communication line, and receives print data sent from the device. It expands the received print data into image data, and feeds the resultant to the image processing section.

The feature expansion board 602 is for extending the editor function of the digital multi function peripheral.

<Mechanical Configuration of Image Output Apparatus>

Next, a mechanical configuration of the printing section and a component for determining the processing speed of the printing will be described.

Figure 1:
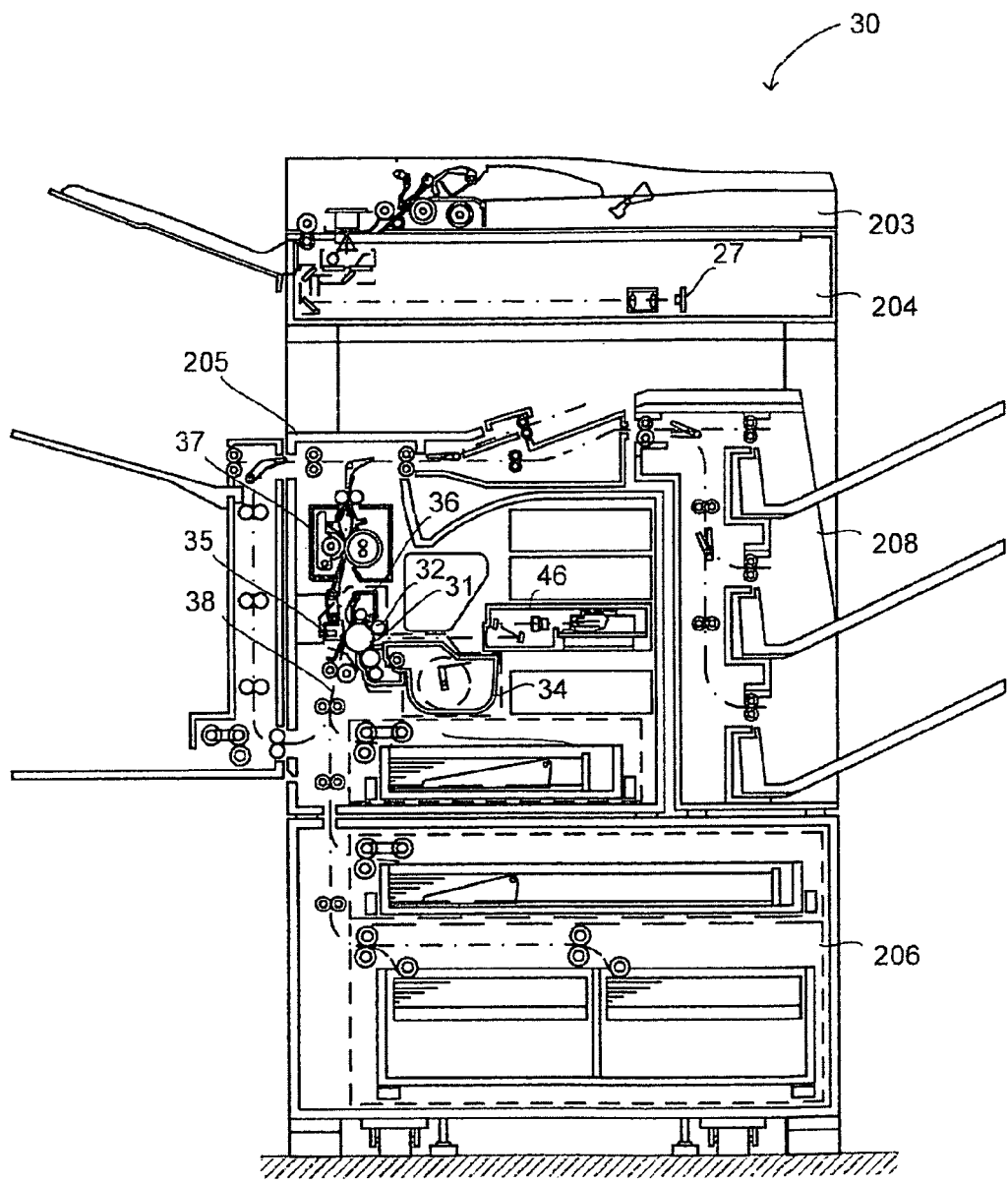
FIG. 1 is a sectional view showing a mechanical configuration of a digital multi function peripheral according to the embodiment of the present invention.

FIG. 1 is a sectional view showing a mechanical configuration of the digital multi function peripheral 30 according to the embodiment of the present invention. In FIG. 1, the digital multi function peripheral 30 has a document transporting section 203, a document reading section 204, an image forming section 205, a sheet feeding and transporting section 206, and a finisher 208.

An operation panel, not shown, is arranged at a near side of the document reading section 204. This operation panel corresponds to the operation panel 103 in FIG. 2. The LCD display section 104 and the operation key group 105 shown in FIG. 2 are arranged in the operation panel 103. The operation panel board 100 shown in FIG. 2 is arranged in the vicinity of the LCD display section 104. When the document reading section 204 functions as a copier or a facsimile, it has a CCD sensor 301 for reading a document. The CCD sensor 301 corresponds to the CCD sensor 301 in FIG. 2. The CCD board 300 shown in FIG. 2 is integrally fixed to the CCD sensor 301.

The image forming section 205, the sheet feeding and transporting section 206, the duplex unit 207, and the finisher 208 correspond to the printing section in the present invention. In the embodiment of the present invention, the printing can be executed without the sheet feeding and transporting section 206, the duplex unit 207 and the finisher 208, so that the minimum component of the printing section is the image forming section 205.

The image forming section 205 prints an image of a document represented by the image data onto a recording sheet. It includes a photosensitive drum 31 for forming an image with an electrophotographic process, a fuser unit 37 for, fusing toner, and the like.

The image forming section 205 is provided with a main transporting path 38. A sheet fed from the sheet feeding and transporting section 206 or a built-in sheet feeding cassette 4 is transported to the upper section of the main transporting path 38 to reach a transferring unit 35.

The photosensitive drum 31 rotates clockwise in FIG. 1. Arranged around the photosensitive drum are a charging unit 32, a developing unit 34, the transferring unit 35, and a cleaning unit 36, those of which are provided for forming an image with an electrophotographic process. A laser scanning unit (LSU) 46 is arranged at the diagonally upper right section of the developing unit 34. The LSU 46 corresponds to the LSU 46 shown in FIG. 2. It turns on/off a laser beam or modulates the intensity of the laser beam, based on a signal outputted from the laser control 404 in FIG. 2. The surface of the photosensitive drum 31 is scanned by the modulated laser beam, whereby an electrostatic latent image corresponding to the image data is formed on the surface of the photosensitive drum 31. The developing unit 34 supplies toner onto the surface of the photosensitive drum 31 to make the electrostatic latent image visible.

The transferring unit 35 transfers the toner image, which is made visible, onto the sheet transported in the main transporting path 38. The fuser unit 37 applies heat and pressure to the toner transferred onto the sheet so as to fuse the toner onto the sheet. The sheet passing through the fuser unit 37 is transported to a sheet exit tray 44 or the finisher 208, and discharged to the outside of the apparatus. Thus, the image is printed onto the sheet.

The speed of the signal outputted from the laser control 404 should agree with the speed that the LSU 46 scans the surface of the photosensitive drum 31, and further should agree with the moving speed of the surface of the photosensitive drum 31. The printing speed of the printing section is a finite speed determined by the property of the photosensitive drum 31, the capabilities of the LSU 46, the developing unit 34 and the fuser unit 37, involved with the electrophotographic process. For example, the moving speed of the surface of the photosensitive drum 31 is 124 mm/sec. The printing speed of the printing section is 27 sheets/min. (lateral feed of A4 size sheet).

<Procedure of Execution of Print Job>

The process of the image data and the flow of the image data in the digital multi function peripheral will be described below in detail, taking the print job as an example.

The digital multi function peripheral 30 in the embodiment of the present invention has a printing function as a copier, printer, and facsimile.

When it functions as a copier, a user sets a document onto the document transporting section 203 or the document reading section 204, and then, gives an instruction to start the reading of the document with the use of the operation key in the operation key groups 105. The instruction is transmitted to the CPU 401 from the CPU 101. The CPU 401 starts the print job (copier job) as a copier according to the instruction. According to the instruction from the CPU 401, the image of the document is read by the CCD sensor 301 by the unit of a page, and reaches the main image processing board 400 through the CCD board 300. Further, according to the control of the CPU 401, the data of the image is subjected to the multi-value image processing such as the shading correction, image segmentation, filter process, or the like by the main image processing board 400, and then, guided to the sub image processing board 500. The binary image processing section 501 of the sub image processing board compresses the data, and stores the resultant to the HDD 506 by the unit of a page.

On the other hand, when the digital multi function peripheral 30 functions as a printer, the printer board 601 receives print data from an external device such as a personal computer or the like. The printer board 601 informs the CPU 401 of the reception of the print data. The CPU 401 starts a print job (printer job) as a printer according to the instruction. The printer board 601 expands the received print data into image data by the unit of a page. The expanded print data is compressed by the sub image processing board 500 and stored in the HDD 506 by the unit of a page according to the instruction from the CPU 401.

When the digital multi function peripheral 30 functions as a facsimile, data transmitted from an opposite party's facsimile apparatus is received by the FAX board 603. The FAX board 603 informs the CUP 401 of the reception of the data. The CPU 401 starts a print job (FAX receiving job) as a facsimile according to the instruction. The FAX board 603 transfers the received data to the sub image processing board 500. The data is stored in the HDD 506 through the binary image processing section 501 of the sub image processing board 500 according to the instruction from the CPU 401.

As described above, the print job is started according to the operation of a user or the reception of data. The image data that should be printed in each print job is temporarily stored in the HDD 506. The CPU 401 sequentially reads the data in each print job from the HDD 506 in synchronism with the operation of the image forming section 205, expands the same, and causes the binary image processing section 501 to perform the image process such as the image rotation or binary zooming, as needed. Thereafter, the image data is transferred to the main image processing board 400. The CPU 401 causes the multi-value image processing section 402 to perform the multi-value image process such as the filter process, image resolution conversion, or the like, and further, to perform the gamma correction, to the transferred image data as needed. The image data subjected to these processes are transferred to the LSU 46 by the unit of a page according to the printing sheet.

In addition to these jobs, the digital multi function peripheral 30 may execute a facsimile transmission job for transmitting the read image of the document as a facsimile, or an image transmission job for transmitting the image to an external device, such as a personal computer or the like, connected via a communication line. These jobs are less related to the present invention, so that the detail description thereof will be omitted.

<Queue>

Next, in a case where a plurality of job execution requests are given, the queue used to manage the order of the start of job by the job control section will be described.

As described above, the CPU 401 controls to perform the process for printing the image data stored in the HDD 506 and transfer the resultant to the LSU 46 in synchronism with the operation of the image forming section 205. There may be a case in which a new print job is started during the period from when the image data is temporarily stored in the HDD 506 to when it is transferred to the LSU 46. In this case, the CPU 401 registers the new print job to the queue for management. Further, the CPU 401 manages the allocation of the hardware resources such as the multi-value image processing section 402, the multi-value memory 403, the binary image processing section 501, the binary memory 505, the HDD 506, and the like to each job. Specifically, since these hardware resources have limited processing capabilities, the CPU 401 manages such that the hardware resource having a capability of only processing one job at one time is sequentially allocated to a different job in order to avoid a collision of the hardware resources. When the hardware resource is occupied by the preceding job, the start of the execution of the job is held with the succeeding job registered in the queue. Preferably, the CPU 401 controls to simultaneously execute a plurality of jobs by which the hardware resources do not collide with each other.

Figure 3:
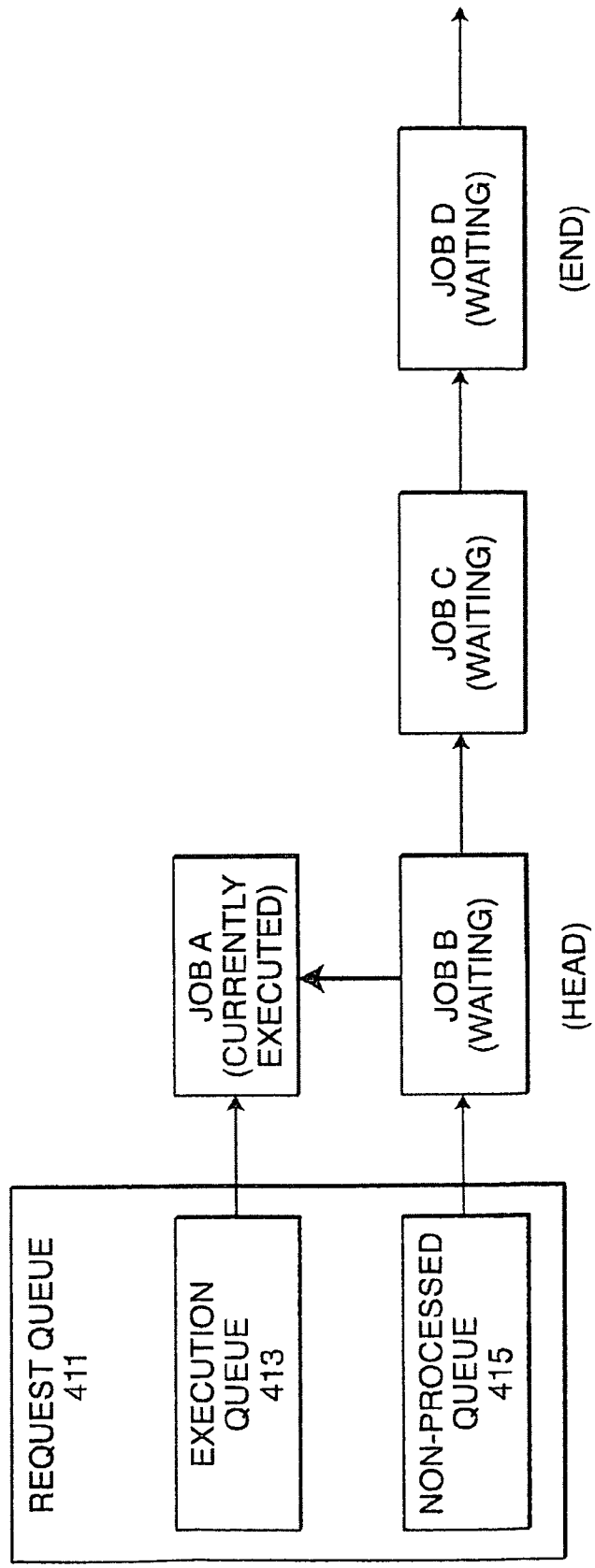
FIG. 3 is an explanatory view conceptually showing a state in which the order of execution of a job is managed by using a queue in the embodiment of the present invention.

In the embodiment of the present invention, FIG. 3 is an explanatory view conceptually showing a state in which the order of the execution of the jobs is managed by using the queue. In FIG. 3, a request queue 411 in the left frame includes an execution queue 413 and a non-processed queue 415. Of these queues, the job that is currently executed is connected to the execution queue 413. The job waiting for the execution is registered to the non-processed queue 415 in a first-in first-out (FIFO) manner. This corresponds to the queue in the present invention.

When receiving a request to start the new job, the CPU 401 checks whether or not there is a job connected to the execution queue 413. When the job is not connected to the execution queue 413, the job that is requested to start is connected to the execution queue 413, and starts this job. On the other hand, in a case where the job has already been connected to the execution queue 413 when the request to start the new job is received, i.e., in a case where there is a job that is currently executed (the job A in FIG. 3), the CPU 401 registers the job that is requested to execute to the non-processed queue 415. The job registered to the non-processed queue 415 is transferred to the execution queue 413 by the CPU 401 when the job that is currently executed is removed from the execution queue 413, i.e., when the execution of the job is completed. The CPU 401 transfers the job to the execution queue 413, and at the same time, starts the execution of the job. When the plurality of jobs are registered to the non-processed queue 415 (job B, job C, and job D in FIG. 3), the CPU 401 transfers the job at the head (the job registered earlier) to the execution queue 413.

As described above, the CPU 401 starts the execution of a print job in the order the request to start the job is received.

<Preview Function>

The preview function according to the display job of the present invention will be described.

The digital multi function peripheral 30 has a preview function for displaying the image involved with the print job registered to the queue onto the LCD display section 104. The start of the job and the procedure of the execution of the job of the preview function will be described below.

When receiving the request of the preview function, the CPU 401 handles the preview as the job similar to the print job (display job), and manages its execution.

Figure 4:
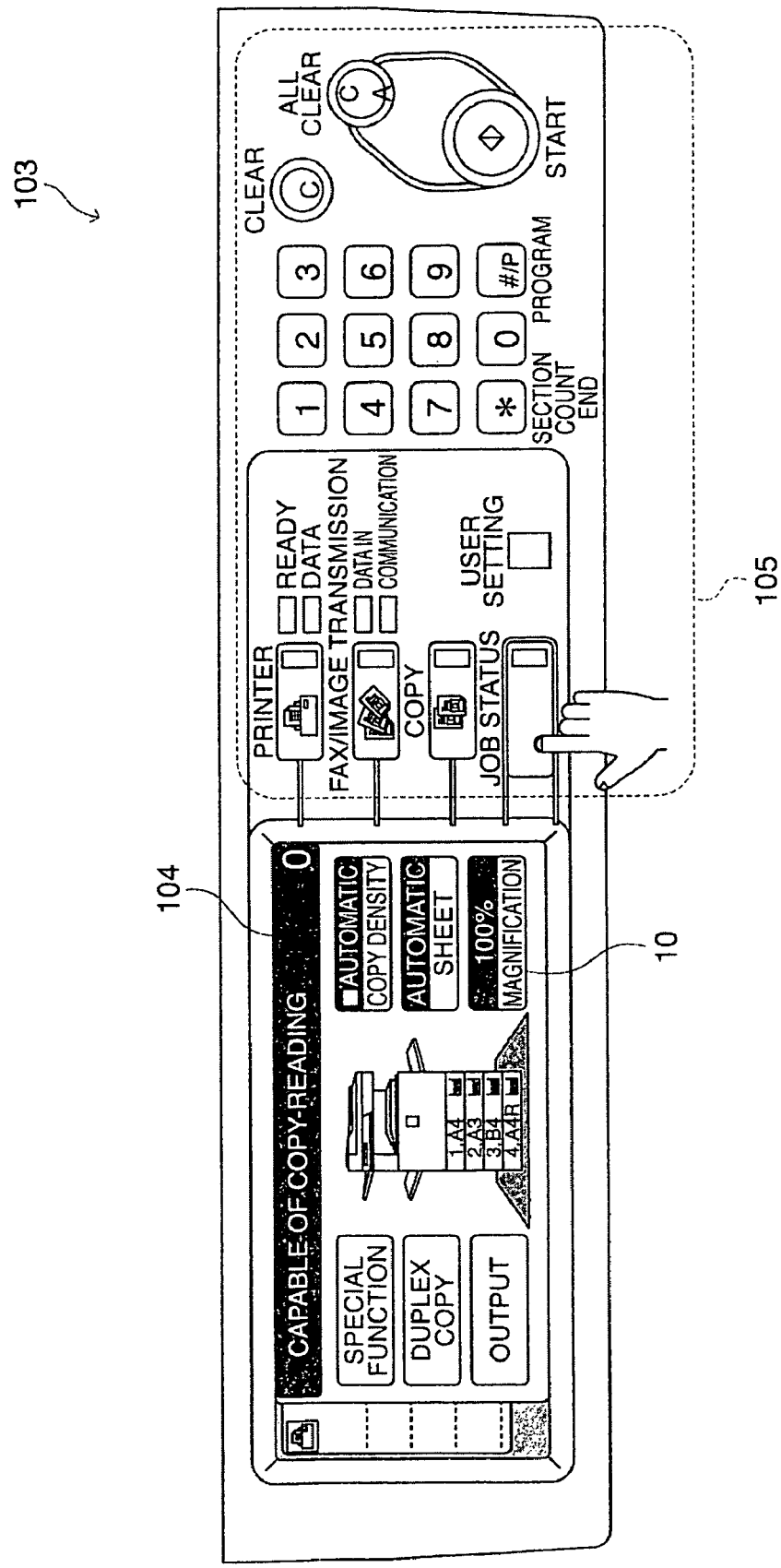
FIG. 4 is an explanatory view showing an appearance of an operation panel of the digital multi function peripheral according to the embodiment of the present invention.

Firstly, the request to start the preview job will be described. FIG. 4 is an explanatory view showing an appearance of the operation panel 103 of the digital multi function peripheral 30 according to the embodiment of the present invention. The LCD display section 104 is arranged at the left half area of the operation panel. The operation key group 105 is arranged at the other area (the area in the frame indicated by a chain line in FIG. 4). The LCD display section 104 has a touch panel function that detects the touch of its surface. The input from the touch panel is handled similar to the input from the operation key group 105. For example, when a user touches the rectangular areas indicated by "copy density", "sheet", "magnification", "special function", "duplex copy", and "output" on the screen displayed on the LCD display section 104 in FIG. 4, the CPU 101 of the operation panel board 100 determines that the input operation involved with each of the display contents is made, and transmits this state to the CPU 401.

Figure 5:
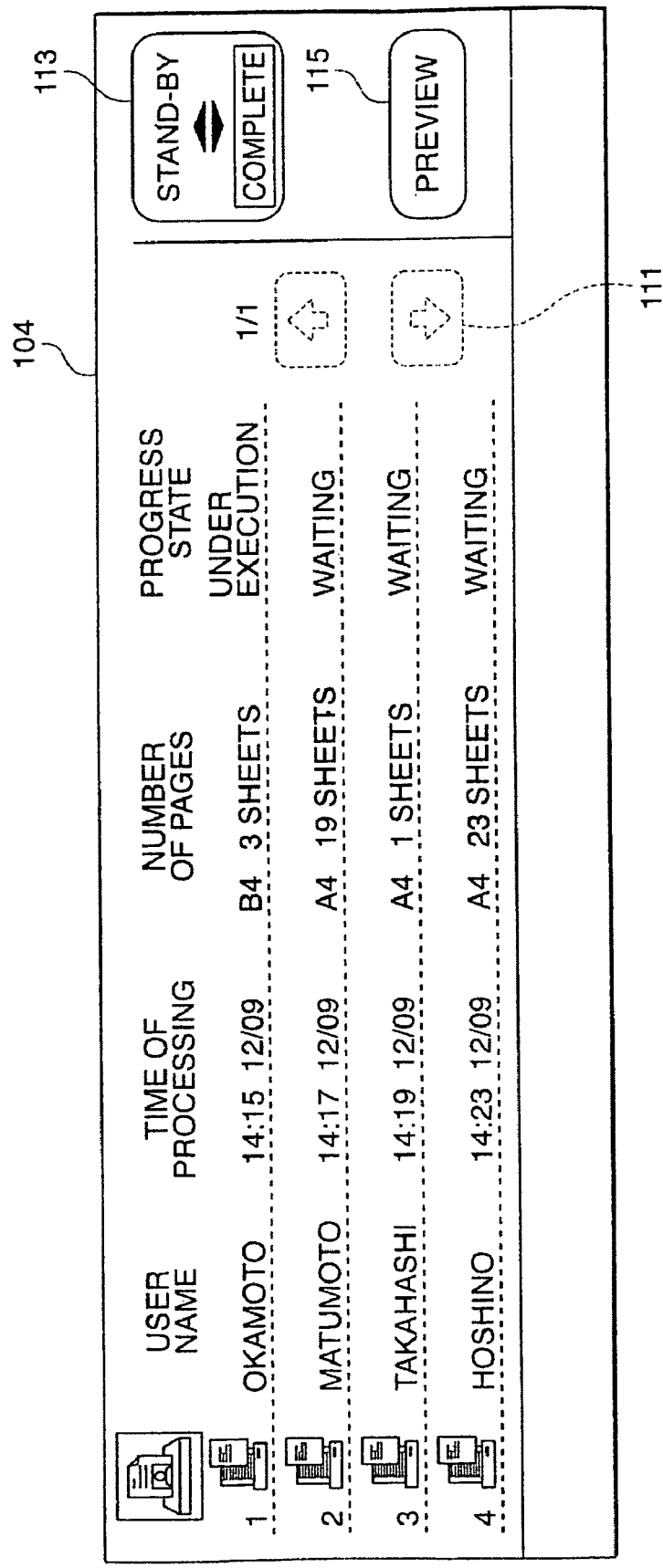
FIG. 5 is an explanatory view showing one example of a job status screen indicating contents of an execution queue and a non-processed queue according to the embodiment of the present invention.

FIG. 5 is an explanatory view showing one example of a job status screen showing the contents of the execution queue and the non-processed queue. The job status screen is displayed on the LCD display section 104 when a user 10 depresses a "job status" key in the operation key group 105 shown in FIG. 4. In FIG. 5, four jobs in the request queue are displayed in the form of a list. The print job having a user name of OKAMOTO is connected to the execution queue. Since the progress state indicates that the job is under execution, it is found that this job is connected to the execution queue. The print job having a user name of MATSUMOTO, the print job having a user name of TAKAHASHI, and the print job having a user name of HOSHINO are registered to the non-processed queue in this order from the head. When more than four print jobs are connected to the request queue, a user may touch a downward arrow button 111 at the right of the list. Then, the list display is scrolled. In the example of FIG. 5, only four print jobs are registered, so that the arrows for the scroll are indicated by a dotted line. A display of "1/1" above the arrows shows that the list display has only one page. When a user touches a portion (stand-by/complete button 113) displayed as "stand-by" and "complete" at the right end of the screen, the history of the jobs that have been completed is displayed. This screen is less related to the present invention, so that the further description will be omitted.

The control of the display content on the LCD display section 104 and the response to the operation of a user described above are realized by the cooperation of the CPU 101 and the CPU 401.

Figure 6:
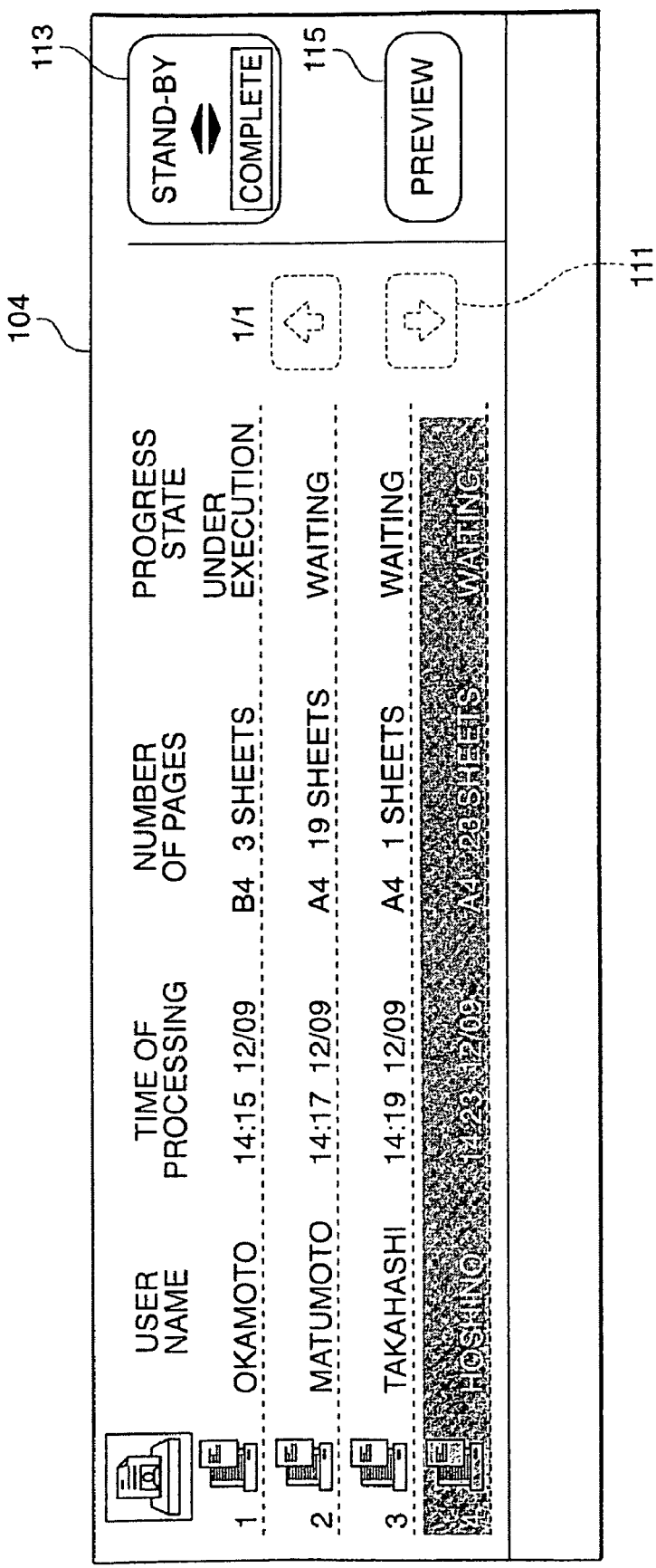
FIG. 6 is an explanatory view showing a state in which a print job having a user name of HOSHINO is selected in FIG. 5.

When a user touches the area of the print job displayed as a list, this job is selected. FIG. 6 is an explanatory view showing a state in which the print job having the user name of HOSHINO is selected in FIG. 5. This job is inversely displayed, which shows that this job is now selected. When the user touches the portion (preview button 115) displayed as "preview" at the right end of the screen with this state, the CPU 401 determines that this operation is the request to start the displayed job. Then, the CPU 401 executes the process of displaying an image of a first page in the print job having the user name of HOSHINO on the LCD display section 104.

Figure 7:
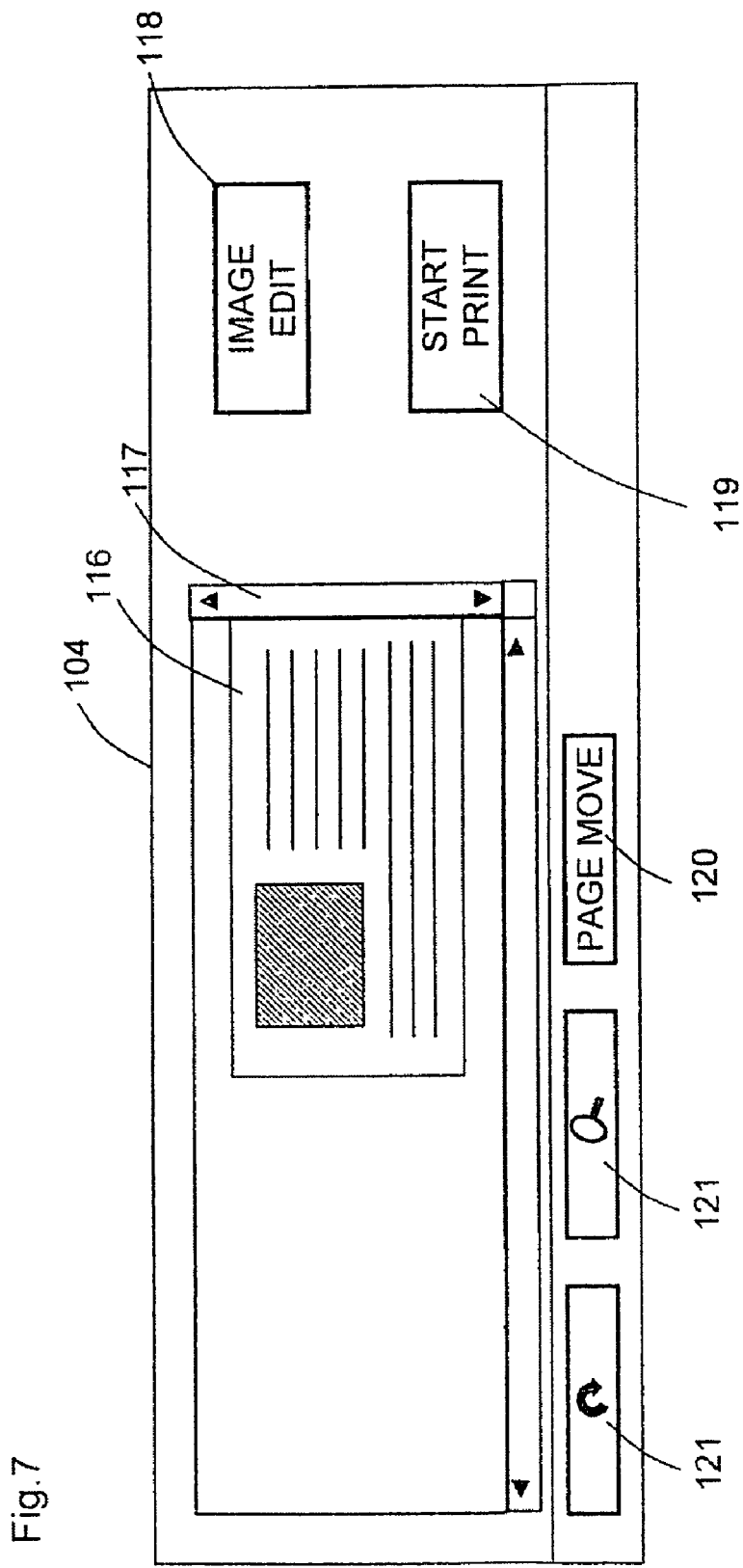
FIG. 7 is an explanatory view showing a state in which an image of a first page of the print job HOSHINO is displayed onto an LCD display section in the embodiment of the present invention.

FIG. 7 is an explanatory view showing a state in which the image of the first page of the print job of HOSHINO is displayed on the LCD display section 104. As shown in FIG. 7, the selected preview image 116 is displayed on the LCD display section 104. The user can confirm the content of the data to be printed by the displayed preview image. When the user touches a print start key 119 after confirming the preview image, the printing output is started. When the user wishes to change the displayed state of the preview image (rotation, enlargement, etc.), the user may touch an image display change key 121. In response to this, the image displayed as the preview image is changed (rotated, enlarged, etc.). When the preview image is displayed as enlarged, and the user wishes to confirm the area not displayed on the screen, the user may touch a scroll bar 117. In response to this, the area to be displayed of the preview image is moved.

In FIG. 7, the image of the first page of the print job of HOSHINO is displayed on the preview image 116. However, when the user touches a page moving key 120, a desired page can be displayed.

When the user wishes to edit the preview image itself, the user may touch a preview image edit key 118. With this state, the image can be edited.

Meanwhile, in order to display the image onto the LCD display section 104, it is necessary that the CPU 401 expands the image data stored in the HDD 506 in the sub image processing board 500, performs the processes such as the image resolution conversion or gamma correction by the main image processing board 400, and then, transfers the resultant image data to the operation panel board 100. In order to read the image data from the HDD 506, expand the image data, and perform the processes such as the image resolution conversion or gamma correction, it is necessary to use the similar hardware resource in the same manner as the print job. Therefore, the CPU 401 manages and executes the preview function as the display job.

When receiving the request to start the display job, the CPU 401 registers this display job to the non-processed queue. Since the preview function defines the job connected to the request queue as the subject to be displayed, the job is connected to the execution queue when the display job is requested. Accordingly, when the request to start the display job is received, it is not conceivable that the display job is connected to the execution queue.

The CPU 401 registers the display job to the request queue as one job, and manages its execution. However, the CPU 401 controls such that the display job waiting for the execution or the display job currently executed is not displayed on the job status screen. Therefore, there is no chance that the preview is requested with the display job selected.

<Management of Order of Execution of Print Job and Display Job>

The process of the job control section for managing the order of the execution of the print job and the display job will be described.

The CPU 401 controls such that the job, which is requested to be started, is registered to the end of the non-processed queue in principle. Whether the job is the print job or the display job does not matter in the order of registration. Therefore, in a case where there is the other job registered to the non-processed queue when the preview is requested, the display job involved with the preview is registered to the end of the non-processed queue. After the preceding jobs are sequentially executed, the display job is executed, and the print data is displayed onto the LCD display section 104. During the execution of the preceding jobs, the CPU 401 causes the LCD display section 104 to display the message of "Preview is in preparation. Please wait for a few minutes." However, there may be a case in which it takes much time to complete the execution of the preceding job. According to one embodiment of the present invention, the CPU 401 controls to cause the LCD display section 104 to display a button of "Priority is given to preview process" in addition to the message described above. When the user touches this button, the CPU 401 determines that this is the second instruction to start the display job. Then, the CPU 401 controls to move this display job to the head of the non-processed queue. Specifically, the CPU 401 controls to preferentially process the corresponding display job in response to the second request to start the display job. The display job registered to the head of the non-processed queue is executed more promptly than the other jobs waiting for the execution, and further, is executed so as not to cause the collision between the print job currently executed and the hardware resource. Accordingly, the order of the process of the print job and the display job is arbitrated in such a manner that the display process, which is expected to respond more quickly than the print process, does not affect the print job currently executed, and the waiting time needed for the preview process is minimized.

A preview button may be employed instead of the button of "Priority is given to preview process". In a case where the preview button is again depressed during when the message of "Preview is in preparation. Please wait for a few minutes" is displayed, the CPU 401 may determine that the second instruction to start the display job is given.

<Procedure of Preview Display>

The procedure of the process of starting and executing the display job by the job control section when the preview is requested will be described.

Figure 8:
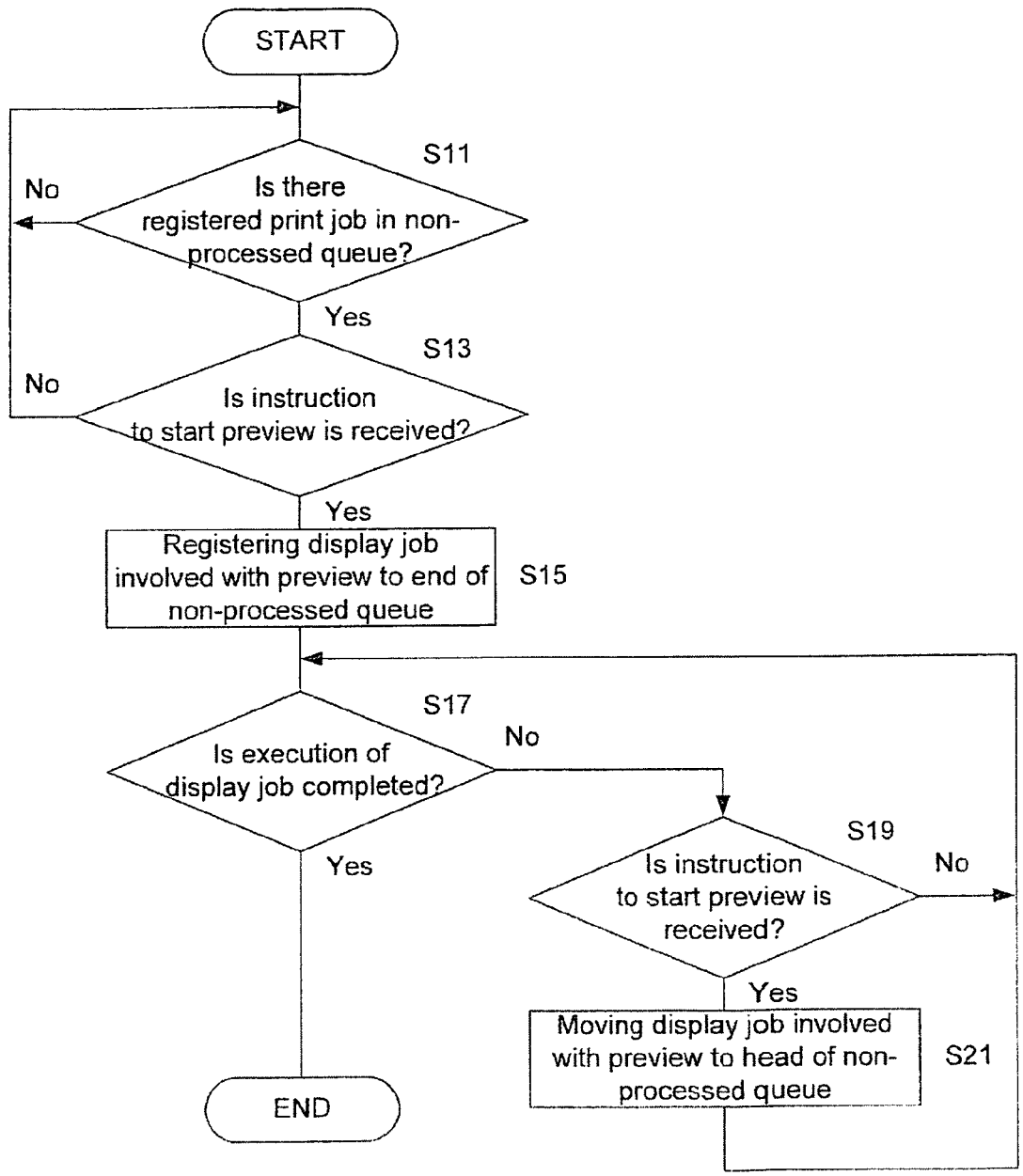
FIG. 8 is a flowchart showing a procedure for controlling the order of start of a display job by a CPU serving as a job control section in the embodiment of the present invention.

FIG. 8 is a flowchart showing a procedure of controlling the order of the start of display job by the CPU 401 serving as the job control section. FIG. 9 is a flowchart showing a procedure of controlling the execution of the display job by the CPU 401 serving as the job control section. The start of the job and the procedure of the execution will be described in accordance with the flowcharts shown in FIGS. 8 and 9.

The process shown in FIG. 8 is the process relating to the registration of the display job and the control of the order of the execution thereof. The CPU 401 repeatedly executes the process shown in FIG. 8 so as to manage the start of the display job. In FIG. 8, the CPU 401 checks whether there is a print job registered to the non-processed queue (step S11). When there is no registered job, the CPU 401 repeats the check in step S11. On the other hand, when there is a registered job, the CPU 401 checks whether the preview button on the job status screen is touched or not (step S13) when the plurality of print jobs are processed, i.e., when a print job is registered to the non-processed queue (YES in step S11). When the preview button is not depressed, the routine returns to step S11 to repeat the process described above. On the other hand, when the preview button is depressed, the CPU 401 registers the display job involved with the preview to the end of the non-processed queue (step S15). The start and execution of the job registered to the non-processed queue are controlled by the routine in FIG. 9 described later.

The description of FIG. 8 is continued. After the display job is registered to the end of the non-processed queue, the CPU 401 checks whether the instruction to start the display job is again given or not. Firstly, it is checked whether or not the registered display job is executed, and its process is completed (step S17). When the display job is currently executed or the display job is waiting for the execution (No in step S17), the CPU 401 checks whether the button of "priority is given to preview process" is depressed or not (step S19). When the button is depressed (Yes in step S19), the CPU 401 moves the display job involved with the preview to the head of the non-processed queue (step S21), and then, the routine returns to the process in step S17. When the button is not depressed, the routine returns to the process in step S17 without changing the order of the display job in the non-processed queue. The CPU 401 repeats the processes after the step S17 until the execution of the display job is completed. When the execution of the display job is ended, the routine is ended.

Subsequently, FIG. 9 will be described. The routine in FIG. 9 is executed when the job connected to the execution queue is completed. As shown in FIG. 9, the CPU 401 checks whether there is a job registered to the non-processed queue when the job currently executed is completed (step S31). If a job is not registered to the non-processed queue, there is no job that should be executed next, whereby the routine is ended. When a job is registered to the non-processed queue, the process of changing the connection of the job at the head of the non-processed queue to the execution queue is executed (step S33). Then, the CPU 401 determines whether or not the job of which connection is changed to the execution queue is a display job or a print job (step S35).

When the job is the display job (Yes in step S35), the CPU 401 controls the procedure of the execution of the display job, and further, controls the hardware resource required for the execution (step S37). The control of the procedure of the execution and the control of the hardware resource are continued until the execution of the display job is completed (step S39). After the execution of the display job is completed, the routine is ended.

On the other hand, when the job of which connection is changed to the execution queue is the print job (No in step S35), the CPU 401 controls the procedure of the execution of the print job, and further, controls the hardware resource required for the execution (step S41). The control of the procedure of the execution and the control of the hardware resource are continued until the execution of the print job is completed (step S43). After the execution of the print job is completed, the routine is ended. Simultaneously, the routine shown in FIG. 9 is started as another task so as to control the start and execution of the next job.

Various modifications are possible for the present invention in addition to the embodiment described above. It should be understood that such modifications also fall within the aspects and scope of the present invention. The present invention is intended to embrace all alterations made within the scope of the invention defined by the appended claims and their equivalents.

What is claimed is:

1. An image output apparatus comprising:
    an image storage section that stores an image to be printed;
    an image processing section that performs a printing image process for printing the stored image and a display image process for displaying the stored image;
    a printing section that prints the image, which has been subjected to the printing image process;
    a display section that displays the image, which has been subjected to the display image process;
    an instruction section that allows a user to selectively instruct execution of a print job, which is a procedure to cause the printing section to print the image, and execution of a display job, which is a procedure to cause the display section to display the image; and
    a job control section that controls the jobs to start the execution of the print job or the display job in response to an instruction from the instruction section, wherein
    when the job control section receives instructions from the instruction section to start a plurality of print jobs and/or display jobs, the job control section controls the jobs to register the print jobs and/or the display jobs in a queue and start these jobs in the order in which the instructions are given, and when an instruction to start a display job in the queue is received from the instruction section while the display job is being registered, the job control section controls the jobs to automatically move the display job to the forefront of the queue to execute the display job.

2. The image output apparatus according to claim 1, wherein
    when a display job is registered in the queue, the instruction section allows a user to give an instruction again for the display job.

3. The image output apparatus according to claim 2, further comprising:
    a job display control section that allows the display section to display information involved with each job in the queue, wherein
    the instruction section allows a user to give an instruction again for the display job, when the information involved with the display job is displayed on the display section.

4. The image output apparatus according to claim 1, wherein
    the display job aims at a preview of an image to be printed.

* * * * *